(12) United States Patent
Fujita et al.

(10) Patent No.: US 11,294,125 B2
(45) Date of Patent: Apr. 5, 2022

(54) OPTICAL CONNECTOR

(71) Applicant: FUJIKURA LTD., Tokyo (JP)

(72) Inventors: Shunsuke Fujita, Chiba (JP); Takahito Otomitsu, Chiba (JP); Shuhei Kanno, Chiba (JP); Kunihiko Fujiwara, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/956,275

(22) PCT Filed: Oct. 16, 2018

(86) PCT No.: PCT/JP2018/038438
§ 371 (c)(1),
(2) Date: Jun. 19, 2020

(87) PCT Pub. No.: WO2019/130736
PCT Pub. Date: Jul. 4, 2019

(65) Prior Publication Data
US 2021/0080656 A1 Mar. 18, 2021

(30) Foreign Application Priority Data
Dec. 25, 2017 (JP) .............................. JP2017-247727

(51) Int. Cl.
G02B 6/38 (2006.01)
G02B 6/122 (2006.01)

(52) U.S. Cl.
CPC ........... *G02B 6/3825* (2013.01); *G02B 6/387* (2013.01); *G02B 6/3879* (2013.01); *G02B 6/3885* (2013.01); *G02B 6/3893* (2013.01)

(58) Field of Classification Search
CPC .... G02B 6/3825; G02B 6/387; G02B 6/3885; G02B 6/122
(Continued)

(56) References Cited

U.S. PATENT DOCUMENTS

| 5,528,711 A * | 6/1996 | Iwano | G02B 6/3817 |
| | | | 385/55 |
| 5,673,346 A * | 9/1997 | Iwano | G02B 6/3817 |
| | | | 385/60 |
| 6,443,630 B1 * | 9/2002 | Serizawa | G02B 6/25 |
| | | | 385/88 |

(Continued)

FOREIGN PATENT DOCUMENTS

| CN | 101551493 A | 10/2009 |
| CN | 102870023 A | 1/2013 |

(Continued)

*Primary Examiner* — Kaveh C Kianni
(74) *Attorney, Agent, or Firm* — Osha Bergman Watanabe & Burton LLP

(57) ABSTRACT

An optical connector includes: a housing that retractably accommodates a ferrule; a spring that is accommodated in the housing to press the ferrule to a front side; and an engaging member connected to one end of the spring, fixed to the housing by engaging with the housing, and including a pair of arm parts arranged to sandwich the spring. When a direction perpendicular to a direction in which the spring presses the ferrule and to a direction in which the pair of arm parts is lined up is an up-down direction, window parts are arranged on both sides in the up-down direction of the housing. The engaging member includes: claw parts that are provided on an upper and a lower side of the pair of arm parts to engage with the window parts; and deformation parts that allow the claw parts to be displaced in the up-down direction.

5 Claims, 6 Drawing Sheets

(58) Field of Classification Search
USPC .......................................................... 385/53
See application file for complete search history.

(56) References Cited

U.S. PATENT DOCUMENTS

| | | | |
|---|---|---|---|
| 6,497,516 B1* | 12/2002 | Toyooka | G02B 6/3882 |
| | | | 385/78 |
| 9,618,718 B2* | 4/2017 | Islam | G02B 6/4429 |
| 9,804,340 B1* | 10/2017 | Lin | G02B 6/3821 |
| 9,933,582 B1* | 4/2018 | Lin | G02B 6/3893 |
| 2002/0118926 A1* | 8/2002 | Shimoji | G02B 6/3869 |
| | | | 385/76 |
| 2004/0105625 A1* | 6/2004 | Ueda | G02B 6/3871 |
| | | | 385/78 |
| 2005/0196106 A1* | 9/2005 | Taira | G02B 6/3849 |
| | | | 385/78 |
| 2014/0056562 A1 | 2/2014 | Limbert et al. | |
| 2019/0041587 A1* | 2/2019 | Waldron | G02B 6/3897 |
| 2020/0174198 A1* | 6/2020 | Ott | G02B 6/3821 |
| 2020/0278502 A1* | 9/2020 | Van Baelen | G02B 6/3893 |

FOREIGN PATENT DOCUMENTS

| | | |
|---|---|---|
| CN | 204758875 U | 11/2015 |
| JP | H11-14862 A | 1/1999 |
| JP | 2005-300904 A | 10/2005 |
| JP | 2008-122728 A | 5/2008 |
| JP | 2012-177780 A | 9/2012 |
| JP | 2014-013309 A | 1/2014 |
| JP | 2016-053711 A | 4/2016 |

* cited by examiner

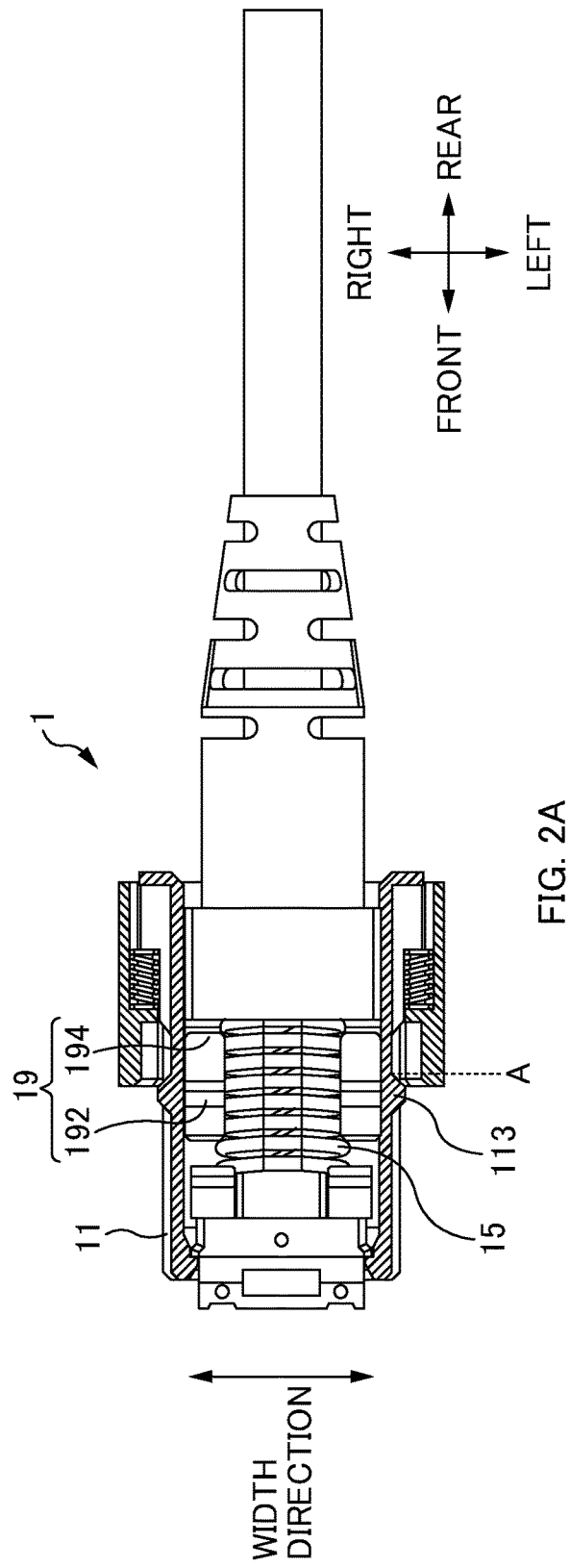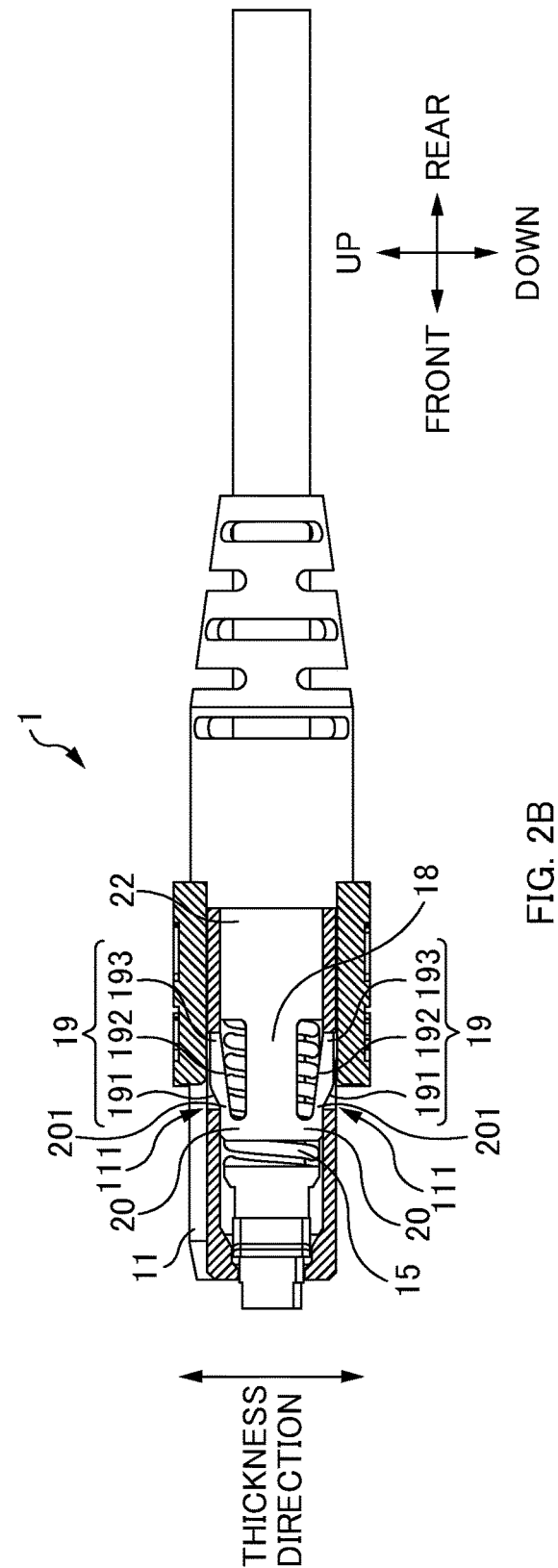
FIG. 2A
FIG. 2B

US 11,294,125 B2

OPTICAL CONNECTOR

TECHNICAL FIELD

The present invention relates to an optical connector.

BACKGROUND

An MPO connector (an F13-type multi-core optical fiber connector established in JIS C5982), for example, is known as an example of an optical connector. A ferrule of the MPO connector is accommodated in a housing in a state of being pressed to the front side (the side of an optical connector of the other side) by the repulsive force of a spring. At this time, the front end part of the spring is fixed to a pin clamp that is arranged on the rear side of the ferrule, and the rear end part of the spring is fixed to a spring push (a spring receiving member). Specifically, an engagement section of the spring push engages with the housing, to thereby fix the spring push within the housing while accommodating the spring in a compressed and deformed state between the spring push and the pin clamp.

In relation to such optical connectors, Patent Literature 1 describes an optical connector including engagement sections provided toward the outside with respect to the spring at tip ends of a pair of arm parts of the spring push. The engagement sections provided at the tip ends of the pair of arm parts are caught in window parts on both side surfaces of the housing, so that the spring push engages with the housing while receiving the repulsive force of the spring.

PATENT LITERATURE

Patent Literature 1: JP 2008-122728A

The manufacturing process (assembling process) of an MPO connector includes a step of inserting a spring push into a housing from the arm parts to allow the engagement sections provided in the arm parts to be caught in the window parts (opening parts) of the housing. In the optical connector described in Patent Literature 1, the engagement sections are provided toward the outside with respect to the spring, and when the arm parts are inserted into the housing, the engagement sections are stuck at inner walls of the housing, so that the engagement sections cannot be inserted as they are. Therefore, by elastically deforming the pair of arm parts inward, the arm parts provided with the engagement sections can be inserted into the housing. However, since the spring is accommodated between the pair of arm parts, when the pair of arm parts are to be elastically deformed inward, the arm parts may not be able to be sufficiently elastically deformed due to interference with (collision with) the spring. In this way, the spring arrangement would restrict the assembling of the spring push with respect to the housing.

SUMMARY

One or more embodiments of the invention provide an optical connector capable of facilitating the assembling of an engaging member (spring push) with respect to the housing without being restricted by the spring arrangement.

According to one or more embodiments of the present invention, an optical connector comprises: a housing that retractably accommodates a ferrule; a spring that is accommodated in the housing to press the ferrule to a front side; and an engaging member connected to one end of the spring, fixed to the housing by engaging with the housing, and including a pair of arm parts arranged to sandwich the spring, wherein: when a direction perpendicular to a direction in which the spring presses the ferrule and to a direction in which the pair of arm parts is lined up is an up-down direction, window parts are arranged on both sides in the up-down direction of the housing, and the engaging member includes claw parts that are provided on an upper and a lower side of the pair of arm parts to engage with the window parts, and deformation parts that allow the claw parts to be displaced in the up-down direction.

Other features of one or more embodiments of the present invention are made clear by the following description and the drawings.

With one or more embodiments of the present invention, it is possible to facilitate the assembling of the engaging member (spring push) with respect to the housing without being restricted by the spring arrangement.

BRIEF DESCRIPTION OF DRAWINGS

FIG. 2A is a plan view (partial cross-sectional view) of the optical connector 1 according to one or more embodiments of the present invention. FIG. 2B is a side view (partial cross-sectional view) of the optical connector 1 according to one or more embodiments of the present invention.

FIG. 4A is a diagram illustrating a state before the spring push 16 or the like is inserted into the housing 11. FIG. 4B is a diagram illustrating a state before the engagement sections 193 of the spring push 16 are latched in the window parts 111 of the housing 11. FIG. 4C is a diagram illustrating a state after the engagement sections 193 of the spring push 16 are latched in the window parts 111 of the housing 11.

FIG. 5A is a diagram illustrating a state before the spring push 16 or the like is inserted into the housing 11 according to one or more embodiments of the present invention. FIG. 5B is a diagram illustrating a state before the engagement sections 193 of the spring push 16 are latched in the window parts 111 of the housing 11 according to one or more embodiments of the present invention. FIG. 5C is a diagram illustrating a state after the engagement sections 193 of the spring push 16 are latched in the window parts 111 of the housing 11 according to one or more embodiments of the present invention.

DETAILED DESCRIPTION

At least the following matters are made clear from the following description and the drawings.

It is made clear that, an optical connector comprising: a housing that retractably accommodates a ferrule; a spring that is accommodated in the housing to press the ferrule to a front side; and an engaging member connected to one end of the spring, fixed to the housing by engaging with the housing, and including a pair of arm parts (i.e., "arms") arranged to sandwich the spring, wherein: when a direction perpendicular to a direction in which the spring presses the ferrule and to a direction in which the pair of arm parts is lined up is an up-down direction, window parts (i.e., "windows") are arranged on both sides in the up-down direction of the housing, and the engaging member includes claw parts (i.e., "claws") that are provided on an upper and a lower side of the pair of arm parts to engage with the window parts, and deformation parts that allow the claw parts to be displaced in the up-down direction. With this optical connector, it is possible to facilitate the assembling of an engaging member (spring push) with respect to the housing without being restricted by the spring arrangement.

When a direction in which the pair of arm parts is lined up is a left-right direction, a length of the spring in the left-right direction is larger than a length of the spring in the up-down direction. In this way, it is possible to facilitate the assembling of an engaging member (spring push) with respect to the housing without being restricted by the spring arrangement.

The deformation parts allow the claw parts to be displaced outward with respect to the arm parts. In this way, it is possible to suppress the engaging member (spring push) of the optical connector from coming out of the housing.

The housing includes an anchor section (i.e., "anchor") to which the claw parts of the adapter are caught when the optical connector is fitted to the adapter, and a front end of the engaging member is located in front of the anchor section. In this way, it is possible to secure the length in a front-rear direction of claw parts engaged with the window parts of the housing while miniaturizing the optical connector in the front-rear direction.

Figure 1:
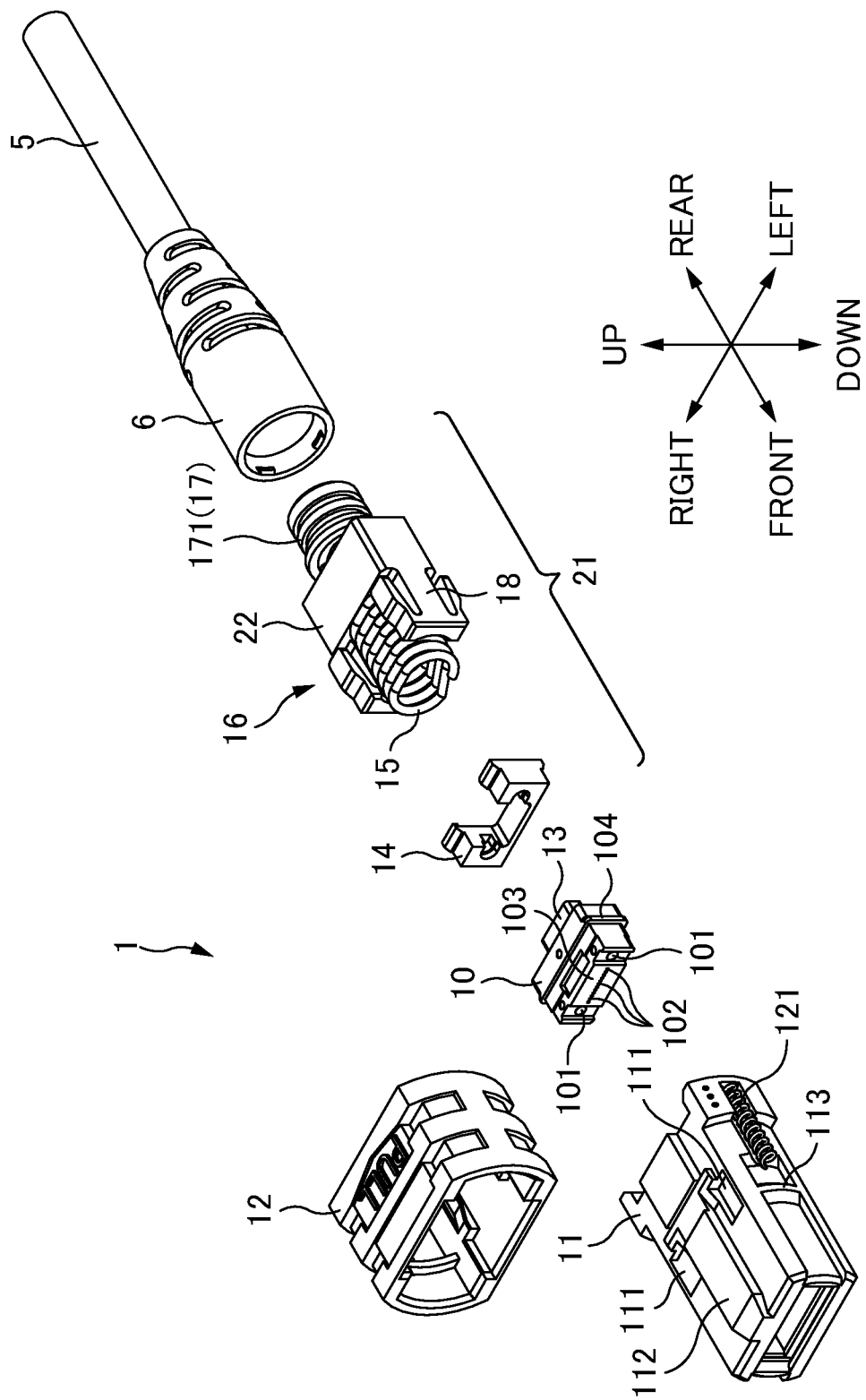
FIG. 1 is an exploded perspective view of an optical connector 1 according to one or more embodiments of the present invention.

Overall Configuration of Optical Connector 1:

FIG. 1 is an exploded perspective view of the optical connector 1 according to one or more embodiments of the present invention.

In the following description, directions will be defined as illustrated in the drawings. Specifically, a direction in which a spring 15 presses a ferrule 10 via a pin clamp 14 is defined as a "front-rear direction", and the side of the ferrule 10 with respect to the spring 15 is defined as a "front", and the opposite side is defined as a "rear". A direction in which a pair of guide pin holes 101 are lined up and a direction in which a plurality of optical fiber holes 102 are lined up are defined as a "left-right direction", and the right side when the front side is viewed from the rear side is defined as a "right side", and the opposite side is defined as a "left side". A left-right direction may also be referred to as a "width direction". A direction perpendicular to the "front-rear direction" and the "left-right direction (width direction)" is defined as an "up-down direction", and the side on which a housing 11 is provided with a key 112 (protrusion) is defined as "up", and the opposite side is defined as "down". An up-down direction may also be referred to as a "thickness direction".

The optical connector 1 according to one or more embodiments of the present invention is the MPO connector (established in JIS C 5982 and IEC 61754-7, and the like). Note that, in FIG. 1, an optical fiber is not illustrated. In practice, for example, a plurality of optical fibers constitutes an optical fiber ribbon, which is accommodated within an optical fiber cord 5 and a connector boot 6. Then, the end parts of the optical fibers (bare optical fibers) from which the coating or the like has been removed are inserted into the optical fiber holes 102 of the ferrule 10, which will be described below. The optical connector 1 includes the ferrule 10 and the housing 11.

The ferrule 10 is a member that holds the end part of the optical fiber. A boot 13 is attached to the rear side of the ferrule 10. The boot 13 is a member that makes the bending of the optical fibers gentle. The boot 13 may be constituted by a flexible material such as rubber or elastomer, but may be constituted by a low flexible material such as resin or metal. The boot 13 reduces the transmission loss of light or protects the optical fibers themselves. The ferrule 10 includes a pair of guide pin holes 101, the plurality of optical fiber holes 102, a connecting end face 103, and a flange part 104.

The guide pin holes 101 are holes into which guide pins (not illustrated) are inserted. In a case where the optical connector 1 is a male type, the guide pins are inserted into the guide pin holes 101 in advance so that the end parts of the guide pins project from the guide pin holes 101. In the case where the optical connector 1 is a female type, the guide pins of the mating optical connector are inserted into the guide pin holes 101. The guide pins and the guide pin holes 101 are fitted to each other at the time of connector connection, to thereby perform alignment of the ferrule 10. Thus, the guide pin holes 101 are sections that constitute positioning parts together with the guide pins.

Each of the fiber holes 102 is a hole for insertion of an end part of the optical fiber. The end parts of the optical fibers are respectively fixed to each of the optical fiber holes 102. In one or more embodiments of the present invention, the optical fibers inserted into the optical fiber holes 102 are single-mode type optical fibers, but may also be multi-mode type optical fibers.

The connecting end face 103 is a connecting end face for connecting to the ferrule of the mating optical connector. The connecting end face 103 is provided on the front side of the ferrule 10. The pair of guide pin holes 101 and a plurality of openings of the optical fiber holes 102 are formed in the connecting end face 103. The flange part 104 is a section that is provided on the rear side of the ferrule 10, and projects outward from the outer circumferential surface of the ferrule 10 body.

The housing 11 is a cylindrical member that accommodates the ferrule 10 while retractably pressing the ferrule 10. A projecting part (not illustrated) projecting toward the inside is provided on an inner wall surface of the housing 11. The projecting part is in contact with the flange part 104 of the ferrule 10, so that the ferrule 10 pressed toward the front side is prevented from falling forward. Anchor sections 113, to which claw parts (not illustrated) of an adapter are caught, are formed on the side of the housing 11.

A coupling 12 is arranged on the outside of the housing 11. The coupling 12 is a coupling member that holds a state in which the claw parts (not illustrated) of the adapter are caught to the anchor sections 113 of the housing 11 (hereinafter referred to as a latch state). The coupling 12 is provided to be slidable in the front-rear direction with respect to the housing 11. A coupling spring 121 is arranged between the coupling 12 and the housing 11, and the coupling 12 is retractably pressed to the front side with respect to the housing 11 by the coupling spring 121. When the claw parts (not illustrated) of the adapter are in a state of being caught to the anchor sections 113 of the housing 11 (latch state), the claw parts (not illustrated) of the adapter are prevented from opening outside by an inner wall surface of the coupling 12, thereby holding the latch state. When the coupling 12 is slid to the rear side with respect to the housing 11 at the time of removal of the optical connector 1, the claw parts (not illustrated) of the adapter are allowed to open outside, and the latch state is released.

The housing 11 also accommodates a floating mechanism 21 that presses the ferrule 10 to the front side. FIG. 1 illustrates the floating mechanism 21 that is accommodated in the housing 11. The floating mechanism 21 is a mechanism that presses the ferrule 10 to the front side. The floating mechanism 21 includes the pin clamp 14, the spring 15, and the spring push 16.

The pin clamp 14 clamps and holds the guide pins (not illustrated). The pin clamp 14 is a member that is arranged at the rear of the ferrule 10. In the case where the optical connector 1 is a male type, the pin clamp 14 holds the rear end of the guide pins (not illustrated). Note that a flange (not illustrated) of the guide pin is arranged to be sandwiched between the rear side endface of the ferrule 10 and the front side endface of the pin clamp 14, so that the guide pins are prevented from falling in the front-rear direction. Note that the guide pins (not illustrated) penetrate through the guide pin holes 101 of the ferrule 10, and tip ends of the guide pins project from the connecting end face 103. A front end part of the spring 15 is fixed to the rear part of the pin clamp 14.

The spring 15 is an elastic member that applies a pressing force to press the ferrule 10 to the front side. The spring 15 is accommodated in the housing 11 in a compressed and deformed state between the pin clamp 14 and the spring push 16. The front end part of the spring 15 is fixed to the pin clamp 14, and the rear end part of the spring 15 is fixed to the spring push 16.

The length in the left-right direction (width direction) of the spring 15 in the optical connector 1 of one or more embodiments of the present invention is larger than the length in the up-down direction (thickness direction) of the spring 15. In other words, the spring 15 is formed to be an elliptical shape having a long diameter in the left-right direction and a minor diameter in the up-down direction when the spring 15 is viewed from the front-rear direction. Note that as will be described below, the spring 15 is arranged to be sandwiched between a pair of arm parts 18 of the spring push 16. As described above, since the spring 15 is formed to be the elliptical shape having a long diameter in the left-right direction when the spring 15 is viewed from the front-rear direction, the gaps between the spring 15 and the arm parts 18 of the spring push 16 are narrower than that in a case where the spring 15 is formed to be a circular shape (the lengths in the left-right direction and in the up-down direction are the same).

The spring push 16 is a member that accommodates the spring 15 in the housing 11 in a state of being compressed. The spring push 16 is caught by the housing 11, so that the spring 15 is accommodated in the housing 11 in a state of being compressed. In this way, the ferrule 10 is pressed to the front side via the pin clamp 14 by the repulsive force of the compressed and deformed spring 15. By pressing the ferrule 10 as described above, when the optical connectors 1 are connected to each other, it is possible to hold a state in which the endfaces of the ferrules 10 physically abut on each other by a predetermined force. The detail of the spring push 16 of one or more embodiments of the present invention is described below.

Spring Push 16:

FIG. 2A is a plan view (partial cross-sectional view) of the optical connector 1 according to one or more embodiments of the present invention. FIG. 2B is a side view (partial cross-sectional view) of the optical connector 1 according to one or more embodiments of the present invention. FIGS. 2A and 2B illustrate cross-sections by cutting out portions of the housing 11 and the coupling 12 of the optical connector 1, in order to illustrate the shape of the spring push 16 and how the spring 15 is arranged in the housing 11.

The spring push 16 includes a connector boot fixing part 17 (not illustrated in FIGS. 2A and 2B, refer to FIG. 1), a spring receiver 22, the arm parts 18, claw parts 19, and the deformation parts 20.

The connector boot fixing part 17 is a section that fixes the spring push 16 to the connector boot 6 (not illustrated in FIGS. 2A and 2B, refer to FIG. 1). The connector boot fixing part 17 is provided on the rear side of the spring push 16. A through hole (not illustrated) through which the optical fiber ribbon is inserted is formed inside the connector boot fixing part 17. A plurality of circumferential grooves 171 are formed on the outer circumferential surface of the connector boot fixing part 17 to prevent the connector boot 6 that is put on the connector boot fixing part 17 from being unintentionally detached.

The spring receiver 22 is a section that supports the rear end part of the spring 15. The rear end part of the spring 15 is fixed to the front side of the spring receiver 22. The connector boot fixing part 17 is provided on the rear side of the spring receiver 22.

The arm parts 18 are plate-like sections that extend to the front side of the spring push 16. The rear end of the arm parts 18 are fixed to the spring receiver 22. The deformation parts 20 are formed on the front side of the arm parts 18. As illustrated in FIG. 2A, the pair of arm parts 18 is provided on both the left and right ends of the spring push 16, and a space between the pair of arm parts 18 is a space for accommodating the spring 15. In other words, the pair of arm parts 18 is arranged to sandwich the spring 15. Note that, in one or more embodiments of the present invention, a direction in which the pair of arm parts 18 is lined up is the "left-right direction". As described above, the spring 15 is formed to be an elliptical shape having a long diameter in the left-right direction when the spring 15 is viewed from the front-rear direction. Thus, the space between the pair of arm parts 18 of the spring push 16 is also formed to be larger in the left-right direction than in the up-down direction.

The claw parts 19 are sections that are engaged with the window parts 111 of the housing 11. The claw parts 19 are provided to be connected to the front ends of the arm parts 18 via the deformation parts 20 which will be described below. The claw parts 19 are sections that are plate-like and extend from the deformation parts 20 to the rear side. The claw parts 19 are cantilever beam shape sections via the deformation parts 20. The pair of claw parts 19 is provided at the upper and lower ends of the deformation parts 20. The pair of claw parts 19 are arranged to sandwich the arm parts 18. As illustrated in FIG. 2B, gaps are provided between the claw parts 19 and the arm parts 18. In this way, the claw parts 19 can be displaced to the inside (the arm parts 18 side). Note that, in one or more embodiments of the present invention, a direction in which the pair of claw parts 19 are arranged (a direction in which the pair of claw parts 19 sandwiches the arm parts 18) is the "up-down direction".

The claw parts 19 include outer tapered surfaces 191, inner tapered surfaces 192, and the engagement sections 193.

The outer tapered surfaces 191 are tapered surfaces that are provided on the outside of the claw parts 19 (the side opposite to the arm parts 18). The outer tapered surfaces 191 are tapered surfaces that are inclined to the outside (the side opposite to the arm parts 18) toward the rear side. As illustrated in FIG. 2B, when the claw parts 19 of the spring push 16 are in a state of being engaged with the window parts 111 of the housing 11 (latch state), the outer tapered surfaces 191 of the claw parts 19 are in contact with (abut on) the front edges of the window parts 111. In this way, the forward movement of the spring push 16 is restricted. Further, the claw parts 19 have the outer tapered surfaces 191, so that it is also possible to suppress the claw parts 19 from being stuck in the inner wall of the housing 11 in the step of inserting the spring push 16 into the housing 11 from the arm parts 18 as illustrated in FIG. 5B, which will be described below.

The inner tapered surfaces 192 are tapered surfaces that are provided on the inside of the claw parts 19 (the side of the arm parts 18). The inner tapered surfaces 192 are tapered surfaces that are inclined to the outside (the side opposite to the arm parts 18) toward the rear side. In this way, as illustrated in FIG. 5B which will be described below, in the step of inserting the spring push 16 into the housing 11 from the arm parts 18, it is possible to suppress the claw parts 19 and the arm parts 18 from interfering (colliding) with each other, when the pair of claw parts 19 are displaced to rotate to the inside (the side of the arm parts 18) about the deformation parts 20.

The engagement sections 193 are sections that engage with the window parts 111 of the housing 11. As illustrated in FIG. 2B, when the claw parts 19 of the spring push 16 are in a state of being engaged with the window parts 111 of the housing 11 (latch state), the distal ends of the engagement sections 193 are in contact with (abut on) the rear edges of the window parts 111.

The deformation parts 20 are sections that displace the claw parts 19 in the up-down direction with respect to the arm parts 18. The deformation parts 20 are sections provided between the front ends of the arm parts 18 and the front ends of the claw parts 19. The deformation parts 20 are sections that are elastically deformed to allow the cantilever shape claw parts 19 to be displaced to the inside (the side of the arm parts 18). Specifically, the pair of claw parts 19 are allowed to be displaced to rotate to the inside (the side of the arm parts 18) about the deformation parts 20. The deformation parts 20 have constriction parts 201. The constriction parts 201 are formed to be thinner than parts except for the constriction parts 201 of the deformation parts 20, and the claw parts 19. In this way, the deformation parts 20 can be easily elastically deformed, so that the claw parts 19 can be easily displaced in the up-down direction with respect to the arm parts 18.

Note that, in one or more embodiments of the present invention, the front end position of the spring push 16 in the housing 11 is provided on the front side, so that the optical connector 1 is miniaturized in the front-rear direction. Specifically, as illustrated in FIG. 2A, the front end of the spring push 16 is located in front of the position A of the anchor sections 113 of the housing 11. In this way, the optical connector 1 can be miniaturized in the front-rear direction while securing the length of the claw parts 19 engaged with the window parts 111 of the housing 11 in the front-rear direction.

Figure 3:
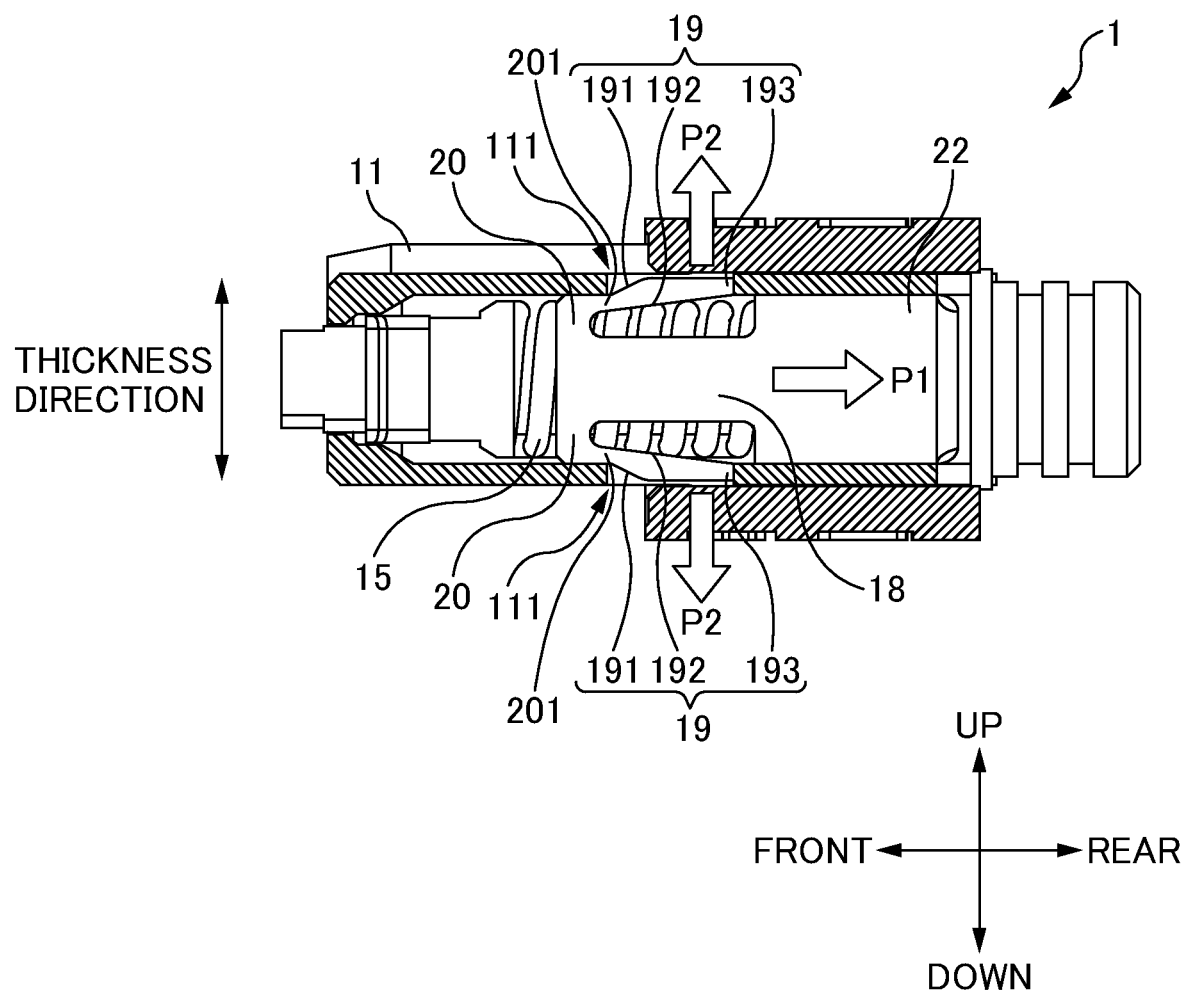
FIG. 3 is an explanatory diagram illustrating functions of the deformation parts 20 according to one or more embodiments of the present invention.

FIG. 3 is a diagram illustrating the functions of the deformation parts 20. As illustrated in FIG. 3, the spring push 16 receives the repulsive force of the spring 15 to receive a force P1 in the rear side direction in the figure. At this time, in one or more embodiments of the present invention, a force P2 is applied in a direction in which the claw parts 19 of the spring push 16 open to the outside (the side opposite to the arm parts 18) around the deformation parts 20, whereby the engagement sections 193 can be suppressed from being detached from the window parts 111. The reason for this is that, when the force P1 is received, the deformation parts 20 is elastically deformed to allow the claw parts 19 to be displaced to open to the outside (the side opposite to the arm parts 18) about the deformation parts 20. As illustrated in FIG. 3, when viewed in a positional relationship in the up-down direction, the deformation parts 20 are located outside (the side opposite to the arm parts 18) of a point where the force P1 acts on the spring receiver 22. Further, the deformation parts 20 are located inside (the side of the arm parts 18) of a point where the force P1 acts on the housing 11 (the rear edges of the window parts 111) via the claw parts 19 (the engagement sections 193). In this way, when the force P1 is received, the deformation parts 20 are elastically deformed, so that the claw parts 19 can be displaced to open to the outside (the side opposite to the arm parts 18) about the deformation parts 20. Further, the engagement sections 193 of the spring push 16 that has received the repulsive force of the spring 15 can be suppressed from being detached from the window parts 111. Note that, in one or more embodiments of the present invention, a direction in which the pair of claw parts 19 are displaced to open is the "up-down" direction.

Further, the claw parts 19 are formed by the outer tapered surfaces 191 that are inclined to the outside (the side opposite to the arm parts 18) toward the rear side and the inner tapered surfaces 192 that are inclined to the outside (the side opposite to the arm parts 18) toward the rear side, so that the claw parts 19 themselves are formed to open to the outside (the side opposite to the arm parts 18) about the deformation parts 20. In this way, the claw parts 19 are easily displaced to further open to the outside (the side opposite to the arm parts 18), so that the engagement sections 193 can be further suppressed from being detached from the window parts 111.

Figure 4A:
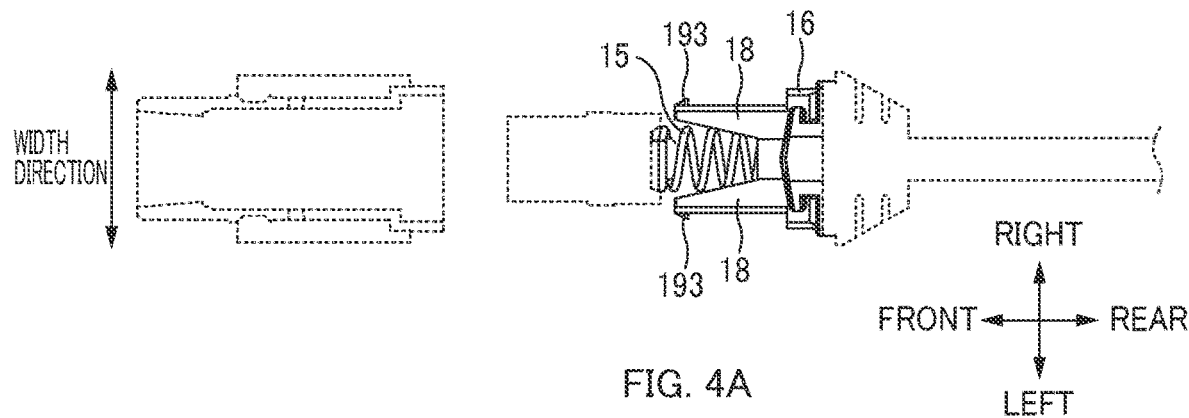
FIGS. 4A to 4C are explanatory diagrams illustrating assembling procedures of an optical connector 1 of a comparative example.
Figure 4B:
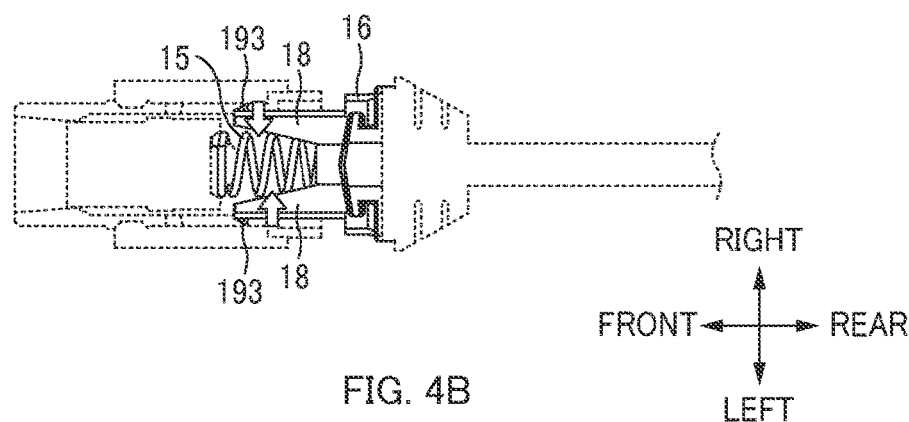
Figure 4C:
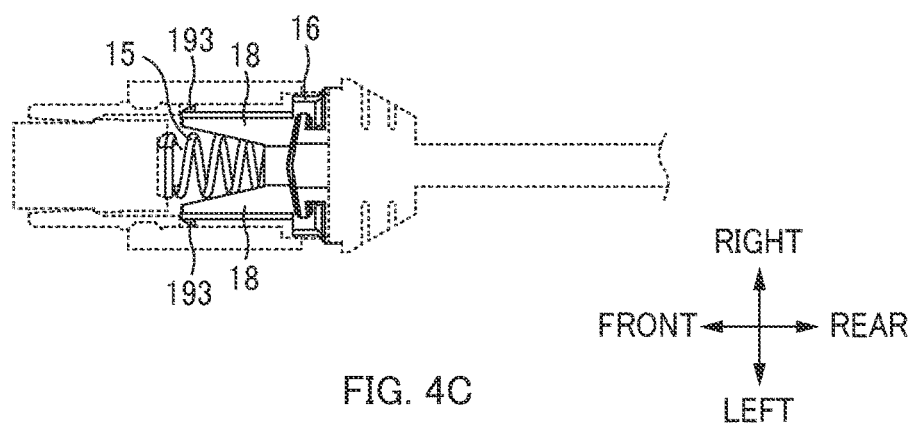

Spring Push 16 of Comparative Example:

FIGS. 4A to 4C are explanatory diagrams illustrating an assembling procedure of an optical connector 1 of a comparative example. How the spring push 16 is latched to the housing 11 in the optical connector 1 of the comparative example is described in the description below. Note that FIGS. 4A to 4C illustrate diagrams when the optical connector 1 of the comparative example is viewed from the upper side. In other words, the diagrams are illustrated when viewed from the same direction as the optical connector 1 of one or more embodiments of the present invention illustrated in FIG. 2A.

FIG. 4A is a diagram illustrating a state before the spring push 16 or the like is inserted into the housing 11. Unlike the spring push 16 of the optical connector 1 of one or more embodiments of the present invention, in the optical connector 1 of the comparative example, the pair of arm parts 18 provided to sandwich the spring 15 from the left side and right side is provided to be elastically deformed to the inside (the side of the spring 15).

FIG. 4B is a diagram illustrating a state before the engagement sections 193 provided on the arm parts 18 of the spring push 16 are latched in the window parts 111 of the housing 11. FIG. 4C is a diagram illustrating a state after the engagement sections 193 of the spring push 16 are latched in the window parts 111 of the housing 11. As illustrated by the arrow in FIG. 4B, in the comparative example, the pair of arm parts 18 of the spring push 16 is elastically deformed to the inside (the side of the spring 15), so that the engagement sections 193 are latched in the window parts 111. However, the spring 15 is accommodated in a direction in which the pair of arm parts 18 is elastically deformed (the inside (the side of the spring 15)), so that the arm parts 18 may not be able to be sufficiently elastically deformed due to interference with (collision with) the spring 15. In other words, the amount of elastic deformation of the arm parts 18 to the inside (the side of the spring 15) is also limited due to the restriction by the arrangement of the spring 15. Further, the amount of elastic deformation of the arm parts 18 to the inside (the side of the spring 15) is limited, so that the length (the depth of the engagement claw) in which the engagement sections 193 engage with the window parts 111 of the housing 11 is also limited. The length (the depth of the engagement claw) in which the engagement sections 193 engage with the window parts 111 of the housing 11 becomes small, so that the engagement sections 193 tend to be easily detached from the window parts 111.

Figure 5A:
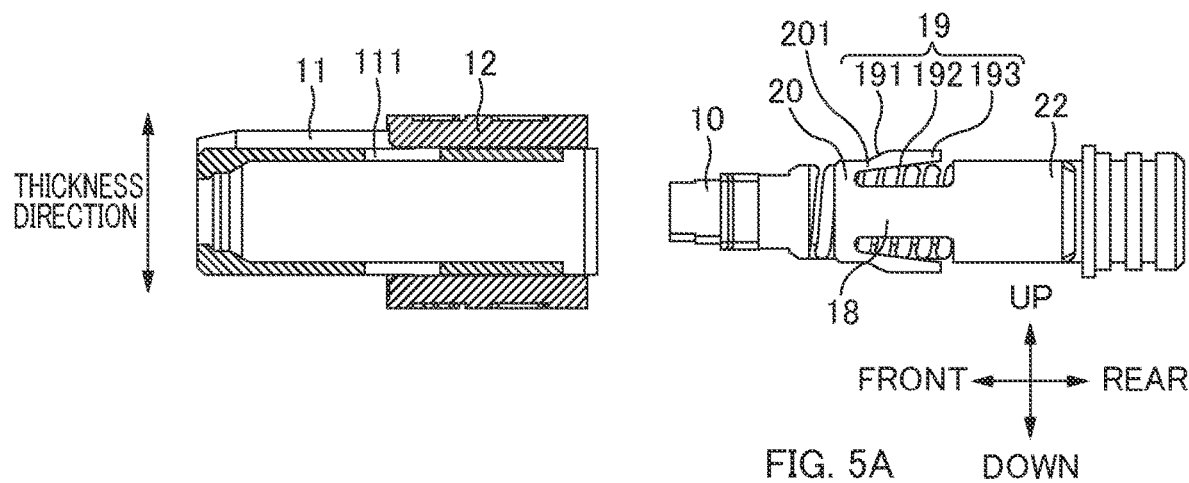
FIGS. 5A to 5C are diagrams illustrating an assembling procedure of the optical connector 1 according to one or more embodiments of the present invention.
Figure 5B:
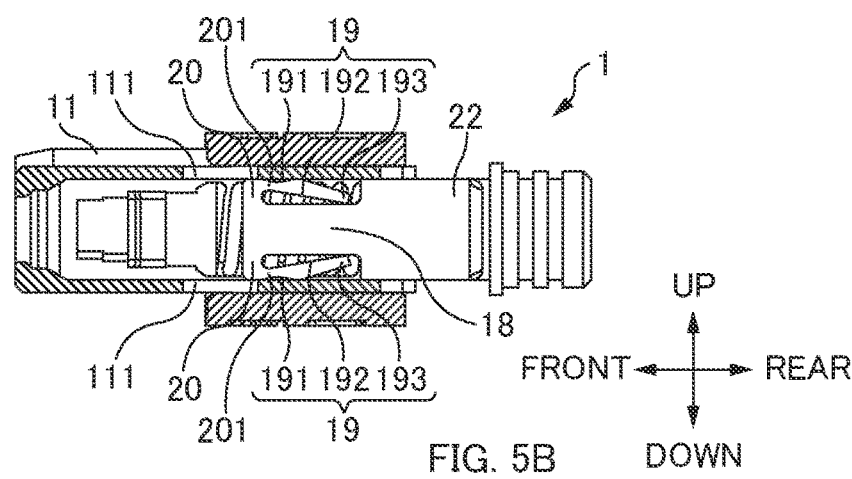
Figure 5C:
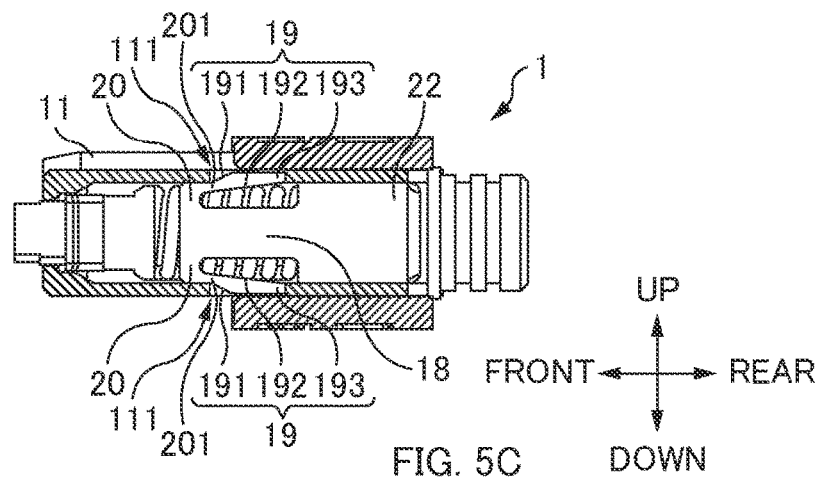

Assembling Procedures of Optical Connector 1:

FIGS. 5A to 5C are diagrams illustrating an assembling procedure of the optical connector 1 of one or more embodiments of the present invention. FIG. 5A is a diagram illustrating a state before the spring push 16 or the like is inserted into the housing 11. FIG. 5B is a diagram illustrating a state before the engagement sections 193 of the spring push 16 are latched in the window parts 111 of the housing 11. FIG. 5C is a diagram illustrating a state after the engagement sections 193 of the spring push 16 are latched in the window parts 111 of the housing 11. Note that FIGS. 5A to 5C illustrate diagrams when the optical connector 1 of one or more embodiments of the present invention is viewed from the left side. In other words, the diagrams are illustrated when viewed from the same direction as the optical connector 1 of one or more embodiments of the present invention illustrated in FIG. 2B. In other words, in comparison with FIGS. 4A to 4C described above, the diagrams are illustrated when viewed from the direction different by 90 degrees.

As already described, in the optical connector 1 of one or more embodiments of the present invention, similarly to the optical connector 1 of the comparative example, the pair of arm parts 18 is arranged to sandwich the spring 15 from the left and right (refer to FIG. 2A). It should be noted, however, that in the optical connector 1 of one or more embodiments of the present invention, the deformation parts 20 on the front side of the arm parts 18 are elastically deformed, so that the cantilever shape claw parts 19 can be displaced to the inside (the side of the arm parts 18), i.e., in the up-down direction. Thus, as illustrated in FIG. 5B, it is possible to suppress the arm parts 18 from interfering (colliding) with the spring 15. Further, the claw parts 19 have the inner tapered surfaces 192, so that it is possible to suppress the claw parts 19 and the arm parts 18 from interfering (colliding) with each other, when the pair of claw parts 19 are displaced to rotate to the inside (the side of the arm parts 18) about the deformation parts 20.

As described above, in one or more embodiments of the present invention, the length in the left-right direction (width direction) of the spring 15 is larger than the length in the up-down direction (thickness direction) of the spring 15, so that the gaps between the spring 15 and the arm parts 18 of the spring push 16 are narrower. In one or more embodiments of the present invention, the deformation parts 20 on the front side of the arm parts 18 are elastically deformed, so that the cantilever shape claw parts 19 can be displaced to the inside (the side of the arm parts 18), i.e., in the up-down direction, and thus it is particularly advantageous to suppress the arm parts 18 from interfering (colliding) with the spring 15.

Figure 6:
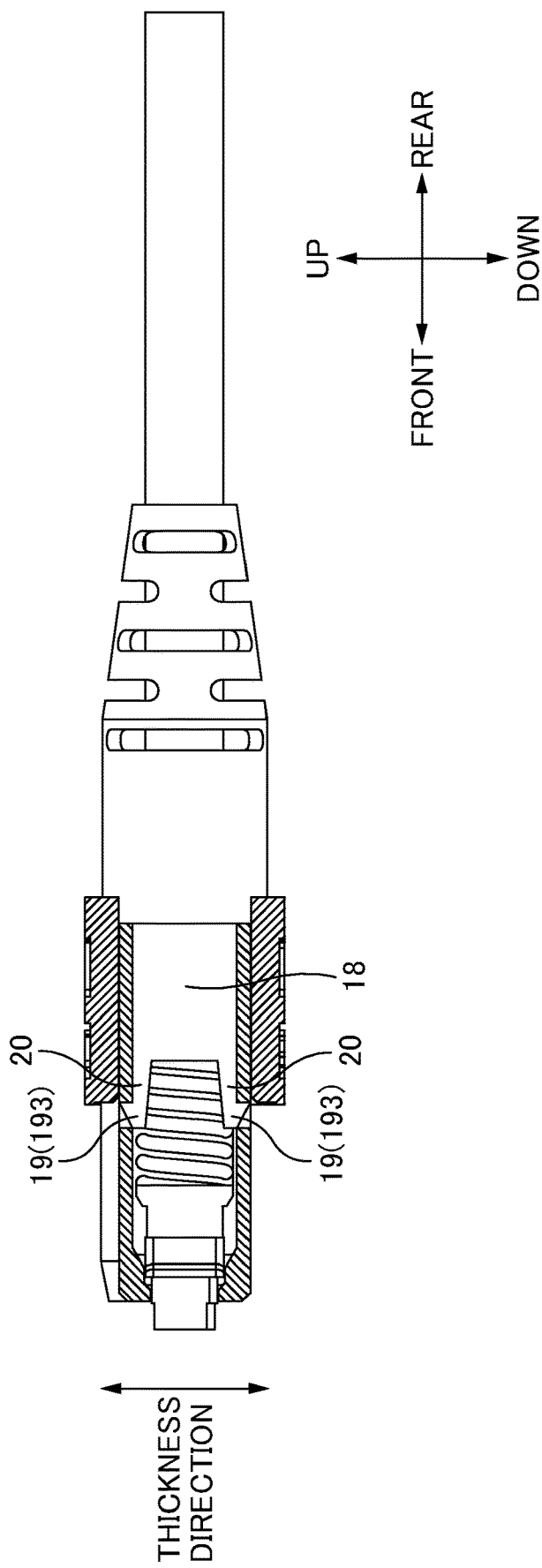
FIG. 6 is a side view of a variation of the spring push 16 according to one or more embodiments of the present invention.

Spring Push 16 Variation:

FIG. 6 is a side view of a variation of the spring push 16. Note that FIG. 6 also illustrates a diagram when the optical connector 1 of one or more embodiments of the present invention is viewed from the left side. In other words, the diagram is illustrated when viewed from the same direction as the optical connector 1 of one or more embodiments of the present invention illustrated in FIG. 2B. In one or more embodiments of the present invention described above, the deformation parts 20 on the front side of the arm parts 18 are elastically deformed, so that the cantilever shape claw parts 19 are able to be displaced to the inside (the side of the arm parts 18). However, as in the variation illustrated in FIG. 6, the deformation parts 20 may be formed to extend from the front ends of the arm parts 18 to the front side.

The pair of the deformation parts 20 in the variation is provided on an upper side and a lower side from the front ends of the arm parts 20. Furthermore, the pair of claw parts 19 (engagement sections 193) is provided on the upper and lower ends of the deformation parts 20. When the spring push 16 or the like is inserted into the housing 11, the arm parts 18 is elastically deformed inside, so that the engagement sections 193 can engage with the window parts 111 of the housing 11.

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS

1: Optical connector;
5: Optical fiber cord;
6: Connector boot;
10: Ferrule;
101: Guide pin hole;
102: Optical fiber hole;
103: Connecting end face;
104: Flange part;
11: Housing;
111: Window part;
112: Key (Protrusion);
113: Anchor section;
12: Coupling;
121: Coupling spring;
13: Boot;
14: Pin clamp;
15: Spring;
16: Spring push (Engaging member);
17: Connector boot fixing part;
171: Circumferential groove;
18: Arm part;
19: Claw part;
191: Outer tapered surface;
192: Inner tapered surface;
193: Engagement section;
20: Deformation part;
201: Constriction part;

21: Floating mechanism;
22: Spring receiver.

The invention claimed is:
1. An optical connector comprising:
a housing that retractably accommodates a ferrule;
a spring that is accommodated in the housing and that presses the ferrule to a front side of a front-rear direction in which the spring presses the ferrule; and
an engaging member that is connected to one end of the spring and that engages with the housing, wherein the engaging member comprises a pair of arms that sandwich the spring, wherein
the pair of arms are lined up in a left-right direction that is perpendicular to the front-rear direction,
an up-down direction of the optical connector is perpendicular to the front-rear direction and to the left-right direction,
the housing has windows on both sides in the up-down direction, and
each arm of the pair of arms further comprises deformation parts and a pair of claws, wherein the deformation parts are disposed on a front side of the arms in the front-rear direction,
the pair of claws are disposed on an upper side and a lower side of the deformation parts, wherein each of the claws extends from the deformation parts to the rear side in the front-rear direction to engage with each of the windows, and
the deformation parts displace the claws in the up-down direction.

2. The optical connector according to claim 1, wherein a length of the spring in the left-right direction is larger than a length of the spring in the up-down direction.

3. The optical connector according to claim 1, wherein the deformation parts displace the claws outward with respect to the arms.

4. The optical connector according to claim 1, wherein the housing comprises an anchor that catches claws of an adapter when the optical connector is fitted to the adapter; and
a front end of the engaging member is located in front of the anchor.

5. The optical connector according to claim 2, wherein the deformation parts displace the claws outward with respect to the arms.

* * * * *